United States Patent [19]

Fischer

[11] 4,063,582
[45] Dec. 20, 1977

[54] ARRANGEMENT FOR AND A METHOD OF ANCHORING A MOUNTING ELEMENT IN A HOLE OF MASONRY AND THE LIKE

[76] Inventor: Artur Fischer, Weinhalde 34, D-7244 Tumlingen, Waldachtal 3, Germany

[21] Appl. No.: 762,035

[22] Filed: Jan. 24, 1977

[30] Foreign Application Priority Data

Jan. 23, 1976   Germany ............................. 2602433

[51] Int. Cl.² .......................................... F16B 39/00
[52] U.S. Cl. ................................... 151/41.7; 52/704; 156/293; 264/262; 264/328
[58] Field of Search ................... 151/41.7, 14.5; 85/63, 85/83; 52/704, 707; 156/293; 264/262, 261, 328

[56] References Cited
U.S. PATENT DOCUMENTS

| 3,240,379 | 3/1966 | Bremer et al. .................. 151/14.5 X |
| 3,339,609 | 9/1967 | Cushman ............................ 151/41.7 |
| 3,392,225 | 7/1968 | Phelan .............................. 151/41.7 X |
| 3,532,316 | 10/1970 | Mathes ............................. 151/41.7 X |
| 3,937,122 | 2/1976 | Riedel ................................. 85/83 X |

FOREIGN PATENT DOCUMENTS

| 1,270,437 | 7/1961 | France ............................. 151/41.7 |
| 902,147 | 7/1962 | United Kingdom ................ 151/41.7 |

Primary Examiner—Ramon S. Britts
Attorney, Agent, or Firm—Michael J. Striker

[57]    ABSTRACT

A device comprises a sleeve-shaped mounting element receivable in a hole of a structure which has a transverse dimension less than the transverse direction of the hole so as to form a circumferential recess between the mounting element and the hole. The mounting element has a central bore and a transverse bore communicating the central bore with the circumferential recess. An adapter element is inserted in the central bore of the mounting element and has a further bore adapted to communicate with a source of a hardenable binding material and the transverse bore of the mounting element so as to establish a path for passage of the binding material from the source into the circumferential recess to be hardened in the latter and to thereby anchor the mounting element in the hole of the structure. Various means are provided for holding the mounting element in a predetermined position relative to the hole, for preventing backflow of the binding material out of the hole, for establishing the path for passage of the bonding material and for interrupting this path for indicating a position in which the path is established, for preventing axial displacement of the mounting element relative to the hole after anchoring therein by the binding material.

20 Claims, 3 Drawing Figures

ARRANGEMENT FOR AND A METHOD OF ANCHORING A MOUNTING ELEMENT IN A HOLE OF MASONRY AND THE LIKE

BACKGROUND OF THE INVENTION

The present invention relates to an arrangement for and a method of anchoring of a mounting element in a hole of masonry or other structure and, more particularly to anchoring a mounting element with use of a hardenable binding material.

The prior art has encountered very serious difficulties when it is desired to mount an object by means of a mounting element anchoring on a low-strength support structure which are typically porous and usually have large vacant cavity areas. In such porous supporting structures having interior hollow cavities separated by partition walls, it has been proposed to utilize an extra-long dowels whose length is selected so that it can engage and grip several of the partition walls in the interior of the support structure. Thus, as a result of distributing the expansion pressure force over several partition walls, a large extraction force is required to remove an object from the support. However, even with this prior art approach, one still subjects the interior of the structure to some crumbling. Moreover, the higher anchoring value frequently necessary to mount an object on a support cannot always be achieved.

It has been further proposed particularly for anchoring mounting elements in porous supporting structures to use adhesives to improve the holding strength or retention of mounting elements. However, the adhesive technique cannot be effectively used for block-type walls having interior cavities, and in the porous structures the retention properties of the dowel are essentially limited by lowbreaking strength of the masonry material.

It is also known in the prior art to mortar dowels into a hole provided in a masonry, which hole has a cross-section considerably larger than the cross-sectional measurement of the dowel. The hole is filled with a cement mixture and then the dowel is inserted into said mixture. Such method possesses the disadvantage that it is acceptable only for anchoring the dowels in a floor, when a binding material does not flow out of the hole. Another disadvantage of this method consists in that the dowel inserted in the hole which hole is filled with the binding material sinks into the binding material, displaces from a required position relative to the hole and is fixed in an incorrect position. In order to ensure that the dowels are correctly positioned in the hole, it is necessary to support and to hold the dowel therein until the mixture sets which is evidently time-consuming.

For all of the above considerations, the only time that dowels are generally cemented into walls is in mass-production of pre-fabricated concrete parts. In this mode of production, the dowels are positioned in place by means of pins which are pre-arranged on slabs. The pins are positioned into the respective inner passages of the dowels and thereby hold the dowels in place until the cement has hardened. This apporach, as the others described above, has the disadvantage of requiring additional holding elements.

SUMMARY OF THE INVENTION

Accordingly, it is a general object of the present invention to overcome the disadvantages of the prior art.

More particularly, it is an object of the present invention to provide an arrangement for and a method of fixedly anchoring a mounting element in a hole of a masonry or other structure.

An additional object of the present invention is to provide an arrangement for and a method of anchoring a mounting element which does not require the mounting element to be held in place after insertion of the same into the hole.

Still another object of the present invention is to provide an arrangement for and a method of anchoring a mounting element which is utilizable for sealing the anchoring hole of a masonry or other structure against outflow of a binding material.

Yet another object of the present invention is to provide an anchoring arrangement which is simple in operation and economical to manufacture.

In keeping with these objects and others which will become apparent hereinafter, one feature of the present invention, resides in an arrangement for anchoring a mounting element in a hole of a masonry or other structure by the use of a binding material which, briefly stated, comprises a sleeve-shaped mounting element having a cross-sectional dimension less than the cross-section of the hole so as to form a circumferential recess between an outer surface of the mounting element and the hole, the mounting element has a central bore adapted to receive therein a threaded element and is provided with at least one substantially transverse bore communicating the central bore with the circumferential recess; ribs provided on a trailing end portion of the mounting element and projecting therefrom for holding the mounting element in a predetermined position relative to the hole, the ribs extend in an axial direction of the mounting element and are circumferentially spaced from one another, the ribs are bevelled towards a leading end of the mounting element and are circumferentially spaced from one another, the ribs are bevelled towards a leading end of the mounting element and have a maximum transverse dimension exceeding the cross-section of the hole; flange member provided on the trailing end portion of the mounting element and transversely projecting from the latter, the flange member has a transverse dimension exceeding the cross-section of the hole so as to prevent backflow of the binding material out of the hole; and adapter element insertable in the central hole of the mounting element of the binding material and the transverse bore of the mounting element so as to establish a path for passage therethrough of the binding material from the source into the circumferential recess to thereby anchor the mounting element in the hole.

The mounting element is inserted in the hole of the masonry so as to form the circumferential recess between the outer surface of the mounting element and the hole and is firmly held in a predetermined position by means of the ribs penetrating into the masonry. At the same time the hole is reliably closed by the flange member which prevents backflow of the binding material. The adapter element is inserted into the central bore of the mounting element and the blind hole of the former communicates with the transverse bore of the latter so as to establish the composite path. The binding material is fed into the blind hole of the adapter element, travels through the same and through the transverse bore of the mounting element, fills the circumferential recess between the outer surface of the mounting element and the hole, and anchors the mounting element in the hole.

The use of the ribs holding the mounting element in a predetermined position relative to the hole, and of the flange preventing backflow of the binding material out of the hole permits to anchor the mounting elements not only in a floor, but also on walls and even on a ceiling and, at the same time does not require holding of the mounting element until the binding material has hardened.

Another feature of the present invention is that after filling the circumferential recess with the binding material, the adapter element is moved to a position in which the blind bore does not communicate with the transverse bore of the mounting element and prevents backflow of the binding material through the transverse bore and the blind hole. After hardening of the binding material in the circumferential recess the adapter element is extracted from the central bore of the mounting element and a threaded element is inserted into the thus emptied central bore of the mounting element.

Still another feature of the present invention is that the central bore of the mounting element is provided with elongation projections extending in an axial direction of said central bore. In this case, the threaded element during screwing thereof into the central bore of the thus constructed mounting element encounters lesser resistance of plastic material of the mounting element, and thereby the screwing of the threaded element into the mounting element is essentially facilitated.

An additional feature of the present invention is to provide means for indicating when the blind bore of the adapter element communicates with a central bore of the mounting element, which means may be formed as two indicia, one of which indicia is provided on a trailing end section of the adapter element and the other indicia is provided on the flange member of the mounting element. These indicia may be made as two indentations located in the respective parts of the arrangement. The one of these indicia is alignable with the other indicia when the blind hole of the adapter element communicates with the transverse bore of the mounting element. Additional indicating means may be provided for indicating a position of the adapter element when the latter is withdrawn after filling the binding material into the circumferential recess and the blind bore of the adapter element does not communicate with the central bore of the mounting element.

Still additional feature of the present invention is that means are provided for fixing the adapter element in the position when the blind hole communicates with the transverse bore of the mounting element, which means may be formed, for instance, as interengaging key and key groove. This prevents undesirable rotation of the adapter element and the mounting element relative to one another.

Yet another feature of the present invention consists in that the adapter element has a leading section, which leading section is of a dimension in an axial direction at least equal to the respective dimension of the transverse bore of the mounting element. After injecting binding material into the circumferential recess the adapter element is slightly displaced in a direction opposite to the direction of insertion of the same so that the thus constructed leading end section becomes positioned across the transverse bore of the mounting element and closes this bore thereby preventing backflow of the binding material out of the circumferential recess.

Finally, still one further object of the present invention is embodied in providing transverse ribs on the outer surface of the mounting element, which transverse ribs are spaced from one another in the axial direction. After hardening of the binding material and anchoring the mounting element in the hole the transverse ribs prevent axial displacement of the mounting element relative to the hole. With these ribs extraction values for the mounting element after the binding material has hardened is vastly superior to the withdrawal values of the prior art mounting elements used until now. The problem of slippage of the mounting element of the prior art has been eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
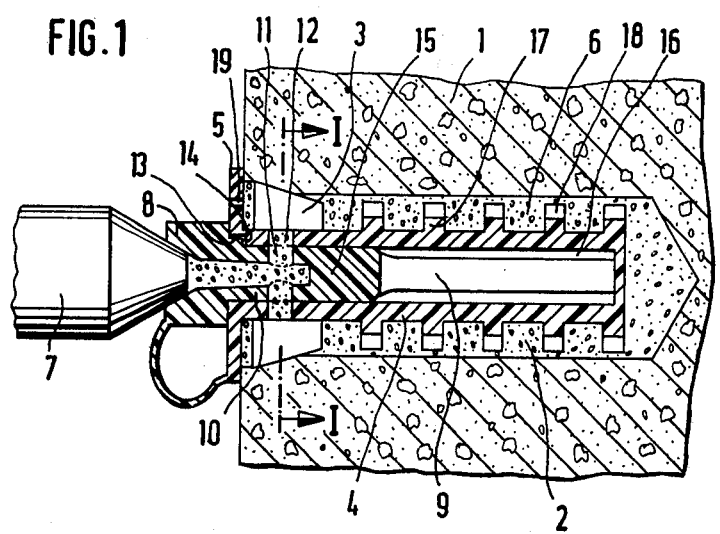
FIG. 1 is a sectional side view of a mounting element anchored in a hole of masonry.
Figure 2:
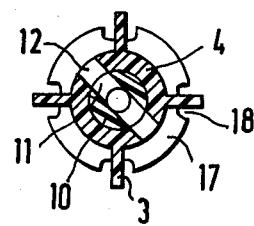
FIG. 2 is a sectional view of FIG. 1 taken along the line 1 — 1.

Referring jointly to the arrangement for and the method of anchoring a mounting element in a hole of a masonry or other structure, it will be seen that reference numeral 1 identifies a masonry in which a hole 2 is provided by boring or a similar drilling operation. A mounting element 4 is insertable into the hole 2 and has a cross-sectional dimension lesser than the cross-section of hole 2 so that a circumferential recess is formed between an outer surface of the mounting element 4 and the hole 2.

The mounting element 4 has a central bore 9 extending in an axial direction of the mounting element 4 from its leading end portion to its trailing end portion, which central bore 9 is adapted to receive therein a threaded element, such as, for instance, a screw for mounting an object such as a panel. An inner surface of the mounting element 4 is formed with projections 16 extending in the axial direction and facilitating screwing of the threaded element into a central bore of the mounting element 4. The central bore 9 communicates with a circumferential recess between the outer surface of the mounting element 4 and the holes by means of a transverse bore 12. It is understood that several transverse bores may be provided for communication of the central bore with the circumferential recess. A flange 5 is connected to the trailing end portion of the mounting element 4 and projects transversely from the same at a distance exceeding the cross-section of the hole 2. The flange 5 serves for covering the hole 2 and sealing the same against outflow of any of the binding material in the fluid state. At the same time it acts as an abutment surface for the mounting element 4. A needle hole 19 is made in the flange 5 for ventilating the hole 2 during injecting the bonding material into the latter.

Ribs 3 are provided on the trailing end portion of the mounting element, which ribs 3 project from the outer surface of the same. The ribs 3 extend in the axial direction and are circumferentially spaced from one another. They are bevelled from the trailing end portion towards the leading end portion of the mounting element 4 and have a maximum transverse dimension exceeding the cross-section of the hole 2. The ribs 3 serve for holding the monting element in a predetermined position relative to the hole 2.

Transverse ribs 17 are further provided on the outer surface of the mounting element 4, which transverse ribs 17 are spaced from one another in the axial direction. They prevent the axial displacement of the mounting element 4 relative to the hole 2 after anchoring the mounting element 4 by the hardened binding material. Each of the transverse ribs 17 has longitudinal slots 18 circumferentially spaced from each other and adapted to permit passage of the binding material through the same when the binding material is being fed into the hole 2.

An adapter element 10 is insertable into the central bore 9 of the mounting element 4 and has a blind hole consisting of a central hole and a transverse hole 11, which transverse hole 11 communicates with the central hole and is open at an outer surface of the adapter element 10. A leading end section of the adapter element 10 is of a length in the axial direction at least equal to the respective dimension of the transverse bore 12 of the mounting element 4 so that the leading end section 15 can close the transverse bore 12 while being positioned across the latter. The central hole has an inlet funnel-shaped part 8 adapted to receive therein an outlet portion of a device 7 for injecting the hardenable binding material. Interengaging key 13 and key groove 14 are provided in the mounting element 4 and the adapter element 10, respectively, for fixing the latter in a position in which the transverse hole 11 of the adapter element 10 is in alignment with the transverse bore 12 of the mounting element 4.

Figure 3:
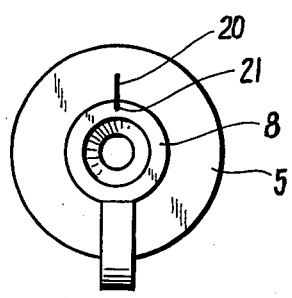
FIG. 3 is a front view of a mounting element showing indicating means.

An arrangement of the present invention may also comprise means for indicating the above mentioned alignment of the transverse hole 11 with the transverse bore 12. As shown in FIG. 3, such means may include at least two indicia, 20 and 21 one of which indicia 21 is provided on the adapter element 10 and the other indicia 20 is provided on the mounting element 4 so that the indicia 20 and 21 align with one another only in the position when the transverse hole 11 of the adapter element 10 aligns with the transverse bore 12 of the mounting element 4. Additional indicating means may also be provided for indicating a position in which the leading end section 15 of the adapter element 10 is positioned across the transverse bore 12 of the mounting element 4 and closes this bore after injecting the binding material into the circumferential recess.

Inasmuch as the adapter element 10 in use is preferably supplied together with the mounting element 4 the former may be connected to the latter by means, for instance, a thin strip as illustrated in FIG. 1, which strip is torn out after extracting the adapter element 10 from the central hole 9 of the mounting element 4.

In operation the mounting element 4 is inserted into the hole 2 as far as the flange 5 permits. The ribs 3 penetrate into parts of the masonry 1 surrounding the hole 2 and reliably hold the mounting element 4 in a predetermined position relative to the hole 2. The flange 5 covers the circumferential recess formed between the outer surface of the mounting element 4 and the hole 2.

Next, the adapter element 10 is inserted into the central bore 9 of the mounting element 4 until a shoulder of the adapter element 10 abuts against the flange 5. The indicia provided on the adapter element 10 and the mounting element 4 is brought into alignment with one another, thereby indicating that the transverse hole 11 of the adapter element 10 is in alignment with the transverse bore 12 of the mounting element 4. The key 13 is inserted into the key groove 14 for preventing undesirable rotation of the adapter element 10 relative to the mounting element 4. The injection device 7 is inserted into the inlet part 8 of the central hole of the adapter element 10 and the binding material injects into this hole. The binding material travels through the transverse hole 11 of the adapter element 10, the transverse bore 12 of the mounting element 4 and fills the circumferential recess between the latter and the hole 2. After termination of the injection of the binding material the adapted element 10 is moved in a direction opposite to the direction of insertion so that the leading end section 15 of the same becomes positioned across the transverse bore 12 and closes the latter. This position is indicated by alignment of the additional indicating means. The binding material is hardened in the circumferential recess and anchors the mounting element 4 in the hole 2. At this point the adapter element 10 is extracted from the central bore 9 and the threaded element is inserted into the latter for mounting the object thereon.

It will be understood that each of the elements described above, or two or more together, may also find a useful application in other types of constructions differing from the types described above.

While the invention has been illustrated and described as embodied in anchoring a mounting element in a hole of masonry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for anchoring a mounting element in a hole of a masonry or other structure by the use of a binding material, a combination comprising a sleeve-shaped mounting element having a cross-sectional dimension less than the cross-section of said hole so as to form a circumferential recess between an outer surface of said mounting element and said hole, said mounting element having a central bore adapted to receive therein a threaded element and being provided with at least one substantially transverse bore communicating said central bore with said circumferential recess; means on said mounting element for holding the same in a predetermined position relative to said hole; means for closing said hole so as to prevent backflow of binding material out of said hole; and an adapter element tightly inserted in said central bore of said mounting element and having a bind hole communicated with a source of said binding material, and said blind hole including a transverse hole portion communicating with said transverse bore of said mounting element so as to establish a path for passage therethrough of binding material from said source into said circumferential recess to thereby anchor said mounting element in said hole.

2. The combination as defined in claim 1, wherein said means for holding said mounting element in said predetermined position are ribs provided on the projecting from said outer surface of said mounting element, said ribs extending in an axial direction and being circumferentially spaced from one another.

3. The combination as defined in claim 1, said mounting element has a leading end portion, and a trailing end portion; and said ribs are provided on said trailing end portion.

4. The combination as defined in claim 3, wherein said ribs are bevelled towards said leading end portion of said mounting element and have a maximum transverse dimension exceeding said cross-section of said hole.

5. The combination as defined in claim 1, wherein said mounting element has a leading end portion and a trailing end portion; and said means for closing said hole comprises a flange member connected to and transversely projecting from said trailing end portion of said mounting element to a distance exceeding said cross-section of said hole.

6. The combination as defined in claim 1, and further comprising means for preventing axial displacement of said mounting element relative to said hole after anchoring therein by said binding material.

7. The combination as defined in claim 6, wherein said means for preventing axial displacement are transverse ribs provided on said outer surface of said mounting element and projecting therefrom, said transverse ribs being spaced from each other in the axial direction of said mounting element.

8. The combination as defined in claim 7, wherein each of said transverse ribs is provided with longitudinal slots circumferentially spaced from one another and adapted to permit passage through the same of said binding material while the latter is being fed into said circumferential recess.

9. The combination as defined in claim 1, wherein said inner surface of said mounting element is provided with elongated projections extending in axial direction of said central bore.

10. The combination as defined in claim 1, wherein said adapter element has a leading end section, a trailing end section and a rear face; said blind hole extending in an axial direction of said mounting element and being open at said rear face and said transverse hole portion being open at an outer surface of said adapter element.

11. The combination as defined in claim 1, wherein said adapter element is movable between a first position in which said blind hole thereof communicates with said transverse bore of said mounting element so as to establish said path, and a second position in which said blind hole thereof does not communicate with said transverse bore of said mounting element so that said path is interrupted, said adapter element including a leading end section which becomes positioned across said transverse bore when said adapter element is in said second position for thereby interrupting said path.

12. The combination as defined in claim 11, wherein said leading end section of said adapter element has a dimension in an axial direction of said mounting element at least equal to the respective dimension of said transverse bore of said mounting element.

13. The combination as defined in claim 11, and further comprising means for indicating when said blind hole of said adapter element communicates with said transverse bore of said mounting element.

14. The combination as defined in claim 13, wherein said means for indicating comprise at least two indicia, one of said indicia being provided on said mounting element and the other indicia being provided on said adapter element, said indicia being alignable with one another only when said adapter element is in said first position.

15. The combination as defined in claim 11, and further comprising means for fixing said adapter element in said first position.

16. The combination as defined in claim 15, wherein said means for fixing said adapter element in said first position comprise two interengaging elements one of which is provided on said mounting element, and the other of which is provided on said adapter element.

17. A combination as defined in claim 16, wherein one of said interengaging elements is a key and the other element is a key groove.

18. A combination as defined in claim 1, wherein said blind hole of said adapter element has an inlet adapted to receive therein an outlet portion of said source of binding material.

19. In an arrangement for anchoring a mounting element in a hole of a masonry or other structure by the use of a binding material, a combination comprising a sleeve-shaped mounting element having a cross-sectional dimension less than the cross-section of said hole so as to form a circumferential recess between an outer surface of said mounting element and said hole, said mounting element having a central axial bore adapted to receive therein a threaded element and the like and being provided with at least one substantially transverse bore communicating said central bore with said circumferential recess; ribs provided on a trailing end portion of said mounting element and projecting therefrom for holding the mounting element in a predetermined position relative to said hole, said ribs extending in an axial direction and being circumferentially spaced from one another, said ribs being bevelled towards a leading end of said mounting element and having a maximum transverse dimension exceeding said cross-section of said hole; a flange member provided on said trailing end portion of said mounting element and transversely projecting from the latter, said flange member having a transverse dimension exceeding said cross-section of said hole so as to backwardly close the same and to thereby prevent backflow of binding material out of said hole; and an adapter element tightly inserted in said central bore of said mounting element and having a blind hole communicating with a source of said binding material, and said blind hole including a transverse hole portion communicating with said transverse bore of said mounting element so as to establish a path for passage therethrough of said binding material from said source into said circumferential recess to thereby anchor said mounting element in said hole.

20. A method of anchoring a sleeve-shaped mounting element in a hole of a masonry or other structure, comprising the steps of inserting in said hole a mounting element of a cross-sectional dimension less than the cross-section of said hole so as to form a circumferential recess between said mounting element and said hole, said mounting element having a central bore and being provided with a transverse bore communicating said central bore with said recess; holding said mounting element in a predetermined position relative to said hole; closing said hole so as to prevent backflow of binding material out of said hole; tightly inserting an adapter element into said central bore of said mounting element, said adapter element having a blind hole adapted to communicate with a source of said binding material, and said blind hole including a transverse hole portion communicating with said transverse bore of said mounting element; communicating said transverse hole portion of said adapter element with said transverse bore of said mounting element; feeding said binding material into said blind hole of said adapter element so that said binding material travels from said transverse hole portion of said blind hole through said transverse bore and into said circumferential recess to fill the same and anchors said mounting element in said hole; and extracting said adapter element from said central bore of said mounting element.

* * * * *